Jan. 6, 1931.  W. D. BOST  1,788,230
WRAPPER REMOVER
Filed May 10, 1929
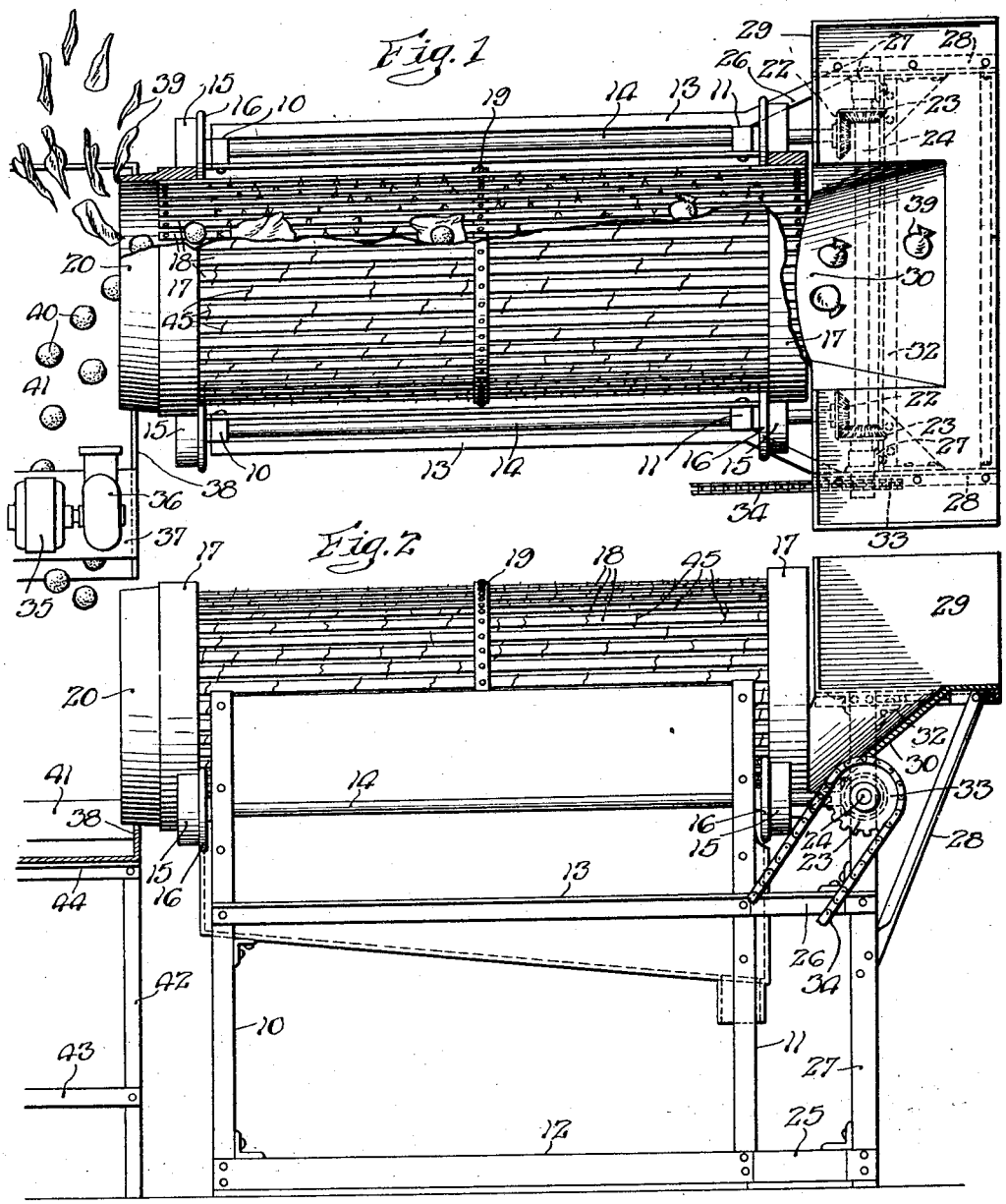
Inventor:
William D. Bost Patented Jan. 6, 1931

1,788,239

UNITED STATES PATENT OFFICE

WILLIAM D. BOST, OF CHICAGO, ILLINOIS, ASSIGNOR TO ORANGE-CRUSH COMPANY, OF CHICAGO, ILLINOIS, A CORPORATION OF ILLINOIS

WRAPPER REMOVER

Application filed May 10, 1929. Serial No. 362,022.

The present invention relates to a device adapted to remove paper and/or other covering from fruit, vegetables and other articles which are individually wrapped.

It is customary and usual at the present time to ship fruit and many vegetables in crates or boxes, each individual fruit being wrapped in a single sheet of paper or other wrapping material.

The purpose of so wrapping fruit and vegetables is to prevent one piece or item from coming into contact with another. It has been shown that if one piece of fruit is diseased and there is an intimate contact with other of the fruit in the casing in which that one piece of diseased fruit is contained that, in an incredibly small time, such single piece of diseased fruit will infect all of the other pieces of fruit resulting in a total loss of the contents of the case or crate. If one piece of fruit is diseased, the single defective piece by individual wrapping is isolated from the other pieces with the result that there is no contagious spread of the defect or disease.

When sound fruit, so wrapped, is received at a cannery, by a beverage, extract or syrup maker, a preserve factory or elsewhere for commercial use and where it is employed in bulk and in large quantity, quite an extensive operation is necessary as a preliminary to preparing the fruit for ultimate disposition. In any preserve, fruit conserve, jelly or juice making or any other operation, it is necessary first to remove the paper from the fruit so that the fruit may then be treated in the next step of the preserving or juice extracting process.

To remove the paper from fruit is ordinarily a manual operation, and until the present discovery was made, it is not known that anyone has developed a suitable instrumentality for the purpose of commercially removing from a large number of pieces of fruit the paper wrappings therefor.

The objects of the invention include, among others, the provision of means for removing the wrapper from fruit or the wrappers from other articles of commerce; a new and novel device for receiving fruit in quantities in wrapped condition and discharging the fruit free from the wrapper, there being means for segregating the wrappers from the fruit; and novel means for separating paper from fruit or other objects about which it is loosely wrapped.

These objects, and such other objects as may hereinafter appear, are attained by the novel construction, unique combination, and improved arrangement of the several elements which constitute the single embodiment of the invention illustrated in the accompanying drawing hereby made a part of this specification and in which Figure 1 is a plan view of a device embodying the subject matter of the invention, numerous parts being broken away to show the mechanical operation of the device;

Figure 2 is a longitudinal elevation of the apparatus illustrated in Figure 1; and Figure 3 is a perspective fragmentary detail of the cylinder in the fruit and paper separating means.

Like reference characters are used to designate similar parts in the drawings and in the description of the invention hereinafter given.

Upon suitable uprights, designated 10 and 11, are a plurality of transverse frame members 12 and 13. Members 10 and 11 extend upwardly to provide journals for a shaft 14, the ends of which are provided with bearing wheels 15 each of which wheels has a peripheral flange 16 to provide a guide for an annular member 17. Said members 17 form the end of a cylinder in which the paper or other wrapping material is removed from the fruit or other article deposited therein.

Said cylinder comprises a plurality of longitudinally arranged slats 18 which extend intermediate the members 17 and which are held in reinforced relation by an annular member 19 disposed approximately half-way between the two members 17.

The left-hand member 17, Figure 2, is provided with a constricted neck or mouth 20 which assists in maintaining the fruit within the cylinder formed of the members 17, 18, and 19, until the paper is all loosened therefrom. Although not tilted upon the frame members 10 and 11, the cylinder, comprising the members 17, 18 and 19 may be tilted whenever this appears to be desirable.

Both sides of the device are similarly constructed, as shown by Figure 1. For driving the shaft 14, to which the members 15 are keyed, such members 15 also providing guiding supports for the fruit receiving cylinder, there are provided gears 22, such gears being in mesh with gears 23 upon a transverse shaft 24.

Extending to the right of Figures 1 and 2 is an extension horizontal frame member 25, and a second horizontal extension frame member 26 thereabove, the two providing support for a vertical frame member 27 upon which the shaft 24 is journalled.

Members 25 and 26 are disposed at an angle rather than in alignment with the members 12 and 13, respectively, the members 27 and braces 28 thereon providing a support for a hopper 29, which hopper is adapted to discharge fruit into the cylinder comprising the members 17, 18 and 19.

Hopper 29 is elevated so that its mouth is on horizontal plane coinciding the horizontal diameter of the said cylinder and may have, as is shown in Figures 1 and 2, a depending lip 30 whereby the fruit is discharged into such cylinder from the hopper 29 away from proximity with the member 17 at the right-hand end of the device (Figure 2).

Hopper 29, in addition to being supported on the bracket 28, is also disposed at the top of the members 27, there being an angle bracket 32 providing support and attachment therefor.

Said shaft 24 is below the hopper 29, and it extends outwardly terminating in a sprocket wheel 33 about which a chain 34 is adapted to move. The prime mover for the chain 34 is not shown, but it may be a motor with a sprocket thereon, or any other suitable driving mechanism.

Adjacent the mouth 20 of the device is a motor 35 which is coupled to a blower 36, the two being mounted upon a base 37 disposed upon a frame 38, so that the paper which drops out of the mouth 20 concurrently with the discharge of the fruit therefrom may be blown aside, the wrappers being designated 39 and the fruit 40.

The fruit 40 is adapted to be discharged into a hopper 41 upon a frame 42 having transverse members 43, there being upon said frame top supporting members 44 and above these are the side members 38 upon which the base for the motor 35 and blower 36 are situated.

Each of the slats 18 at spaced intervals is provided with a wire member or other suitable barb, designated 45. This member has a body section 46 adapted to extend about a slat 18, the ends 47 being first twisted about themselves as shown in 48, so that there is left a pair of projecting blunt points 47 which will snag paper but will not damage the fruit. No regularity in the position of the barb 45 in respect to the slats 18 is necessary, and a relatively few thereof are required as is indicated in both Figures 1 and 2. Any staggered or symmetrical arrangement may be adopted for the barbs 45.

In operation, fruit is fed into the hopper 29. Generally, the fruit is obtained in bunches each individual fruit being wrapped in paper as hereinabove stated. The fruit falls from the hopper 29 into the cylinder comprising the member 17, 18 and 19, in which member it is adapted to be rolled as the cylinder is rotated by the prime mover, not shown, which prime mover, through the gears described, rotates the guide pulleys 15 which in turn engage the members 17 of the cylinder.

As the rotation continues, the fruit travels the length of the cylinder and is discharged therefrom through the mouth 20. During its travel, the fruit is gently shaken and rotated and from time to time the paper about the fruit engages or is engaged by the barbs 45.

Some of the paper is loosened from the fruit without the aid of the barb. But before the fruit may travel the full length of the cylinder, in every instance, the paper is loosened therefrom and is separated from the fruit. Some of the paper adheres to the barbs 45 but this does not render the device ineffective for the constant agitation going on in the cylinder eventually loosens all papers which temporarily adhere to such barbs.

The paper wrappers eventually work out through the mouth 20 where the blower 36 driving a blast of air directly across the mouth of the cylinder, blows such paper to one side allowing the fruit 40 to run through hopper 41 free from paper to such other treating device as may be associated with hopper 41. In this way an automatic removal of wrapping paper is obtained, it being necessary only to feed the fruit into the hopper 29. The quantity so fed need not be carefully regulated for all the fruit, because it is slowly carried through the cylinder, will be freed from the paper before the mouth 20 is reached.

Whenever fruit is mentioned, unless the context forbids, vegetable or other wrapped articles are included, and of course paper includes any form of sheet wrapping material.

I claim:

1. Fruit unwrapping means comprising a cylindrical drum, a plurality of barbs upon the walls of said drum, a loading hopper at one end thereof and partially blocking the said end, and means for rotating said drum.

2. Fruit wrapper removing means comprising a drum, barbs upon said drum, a loading hopper for said drum and closing one end of said drum, the other end of said drum being free from obstruction, and a blower in juxtaposition to the latter end.

3. Fruit wrapper removing means comprising a drum, barbs upon said drum, a loading hopper for said drum and partially blocking one end thereof, the other end being unobstructed, and means for removing the wrapper when separated from the fruit by said barbs and drum.

WILLIAM D. BOST.